United States Patent [19]
Ruottu

[11] Patent Number: 5,026,269
[45] Date of Patent: Jun. 25, 1991

[54] METHOD AND A DEVICE FOR CONTROLLING THE MIXING OF GASEOUS FLOWS IN A FLUIDIZED BED COMBUSTION CHAMBER

[75] Inventor: Seppo K. Ruottu, Karhula, Finland

[73] Assignee: Einco Oy, Karhula, Finland

[21] Appl. No.: 460,873

[22] PCT Filed: Aug. 6, 1987

[86] PCT No.: PCT/FI87/00102
§ 371 Date: Mar. 27, 1990
§ 102(e) Date: Mar. 27, 1990

[87] PCT Pub. No.: WO89/01115
PCT Pub. Date: Feb. 9, 1989

[51] Int. Cl.$^5$ .............................................. F23D 3/40
[52] U.S. Cl. ........................................ 431/7; 431/170;
122/4 D; 110/245; 422/143
[58] Field of Search ............... 431/7, 170; 122/4 D;
110/245; 422/143

[56] References Cited

U.S. PATENT DOCUMENTS

| | | | |
|---|---|---|---|
| 4,427,364 | 1/1984 | Bergkvist | 122/4 D |
| 4,627,812 | 12/1986 | Kelly et al. | 431/7 |
| 4,628,831 | 12/1986 | Delessard | 110/245 |
| 4,785,768 | 11/1988 | Brown et al. | 431/170 |

FOREIGN PATENT DOCUMENTS 2001744 2/1979 United Kingdom.
1604312 12/1981 United Kingdom.
2082469 3/1982 United Kingdom.

*Primary Examiner*—Carroll B. Dority
*Attorney, Agent, or Firm*—Banner, Birch, McKie & Beckett

[57] ABSTRACT

The invention relates to a method and a nozzle bottom for controlling the mixing of gaseous flows in fluidized bed reactors and circulating fluidized bed reactors. In the method, part of the combustion air is introduced into a reactor chamber through fluidizing nozzles (11) positioned in a nozzle bottom (4). In order to improve the controllability of a combustion process, the remaining part of the combustion air is according to the invention introduced through essentially vertically directed jet nozzles (12) positioned in the nozzles bottom (4), and the vertical penetration of the air jets applied through the jet nozzles (12) is maintained at a value essentially higher than the vertical penetration of the air jets applied through the fluidizing nozzles (11). The nozzle bottom (4) according to the invention thus comprises, in addition to the fluidizing nozzles (11), essentially vertically directed jet nozzles (12) the diameter of which is larger, preferably 5 to 20 times larger than the diameter of the fluidizing nozzles (11) and the number of which is essentially smaller than the number of the fluidizing nozzles (11).

3 Claims, 1 Drawing Sheet

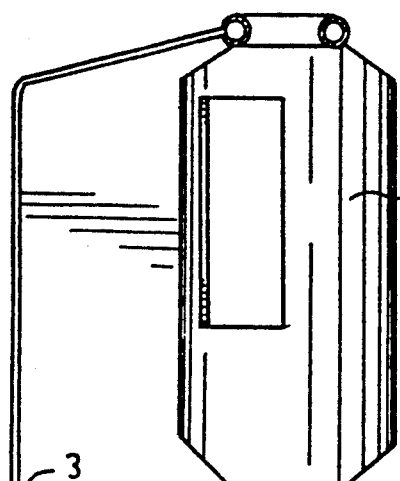
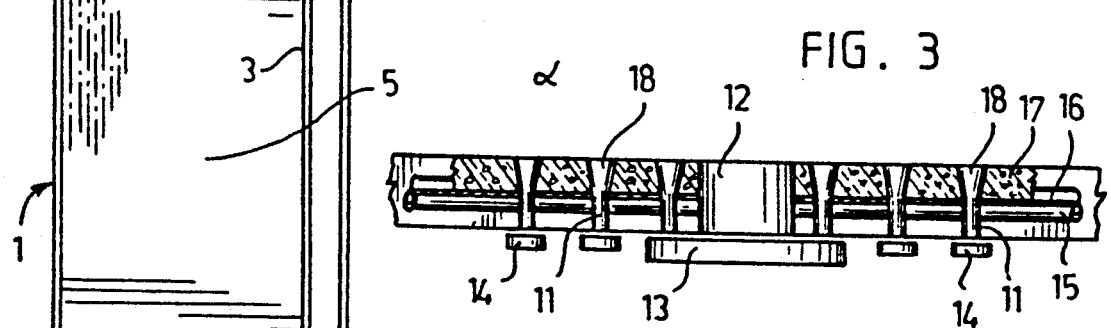
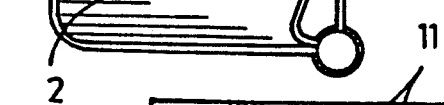
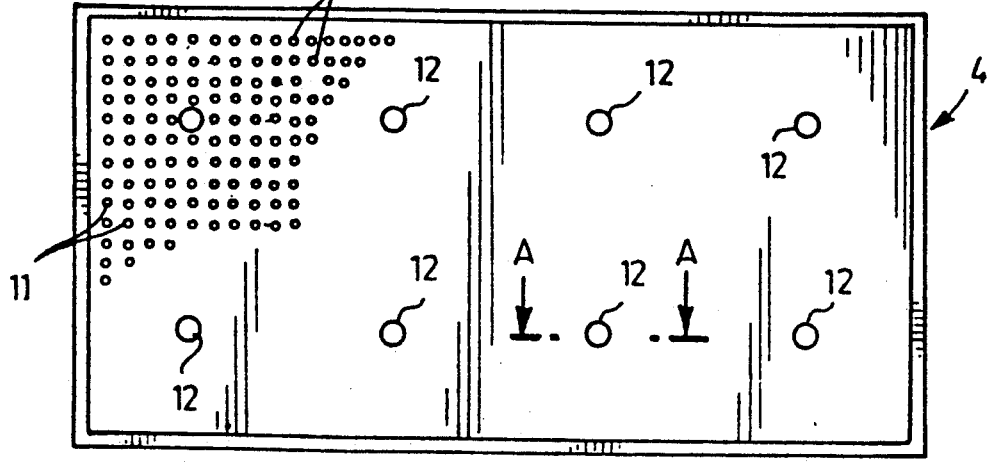

METHOD AND A DEVICE FOR CONTROLLING THE MIXING OF GASEOUS FLOWS IN A FLUIDIZED BED COMBUSTION CHAMBER

The invention relates to a method for controlling the mixing of gaseous flows in fluidized bed reactors and circulating fluidized bed reactors. In the method, part of the combustion air, i.e. the so called fluidizing or primary air, is introduced into the reactor through fluidizing nozzles positioned in a nozzle bottom. The invention is also concerned with a nozzle bottom comprising a plurality of fluidizing nozzles for introducing fluidizing air into the reactor chamber.

In fluidized bed combustion and particularly in so called circulating fluidized bed combustion, there has been a tendency towards large units. At present, the larger units have a thermal power of 200 to 300 MW. Practical research and development (1986) has concentrated on units having a thermal power of up to 1000 MW. One of the most serious problems of this kind of units is the control of the mixing of gaseous compounds and flows. The competitiveness of circulating fluidized bed combustion (CFB combustion) is mainly due to the fact that the discharges of nitric oxide and sulphur oxide can be reduced at low cost. The discharge of sulphur oxide can be reduced by staging of the combustion air in such a manner that the mole fraction of free oxygen is approximately very small in the lower portion of the CFB reactor. Today, this is effected by introducing 40 to 80% of the combustion air through fluidizing nozzles positioned in the nozzle bottom and the remaining part through nozzles having a higher position on the side walls. The mixing problems have become apparent in relatively small units already in use. The problems are further aggravated in CFB reactors where the suspension density is high (from 5.0 to 50.0 kg/m$^3$) throughout the reactor, whereby the penetration of the transversal jets into a vertical massive main flow is insufficient.

Secondary nozzles positioned on side walls result from the traditional way of thinking according to which the fluidizing gas has to be distributed evenly at least in each grate sector. In all present large fluidized bed and CFB reactors, in which the combustion air is introduced in a stage-wise manner for the reduction of the NO$_x$ discharges, air is distributed according to a known principle: primary air is distributed evenly all over the nozzle bottom and secondary air is introduced essentially horizontally through the nozzles of the side walls.

Patent applications concerning the nozzle bottom disclose several solutions in which the air or the treating gas is introduced through separately adjustable nozzles or in which the gas flow of the nozzle bottom can be adjusted separately in each sector. The object of these inventions has been either to widen the range of power of the reactor (nozzle bottoms to be fluidized each sector separately) or to facilitate and control the transversal mixing of the fluidized material. These applications include Finnish Patent Application 830171, in which the treating gas is introduced into the reactor through two separate and separately adjustable nozzle groups. The whole nozzle bottom is formed by this kind of nozzle pairs positioned evenly all over the nozzle bottom. The object of said invention is to enable a wide range of power of the fluidized bed reactor, simultaneously avoiding an excessive particle loss from the reactor. For this purpose it is suggested in said patent application that a gas flow is introduced through fluidizing nozzles having the shape of a pyramid opening in the grate plane, the flow rate of the gas flow corresponding to the superficial velocity of the reactor, i.e. 2 to 3 m/s. A gas flow with a flow rate exceeding this velocity (a flow rate of 3 to 8 m/s) is introduced through secondary nozzles opening above the grate plane so that it does not affect the solid substance flow being carried away to any greater degree. Said invention is not concerned with the penetration of the jets of the primary and the secondary nozzles nor with the controlled delaying of the mixing. The object is said to be to obtain the best possible mixing over the whole transverse surface of the reactor.

British Patent Specification 2,001,744 discloses a fluidized bed furnace in which the reactor is tiltable around a shaft. This is made possible by dividing the nozzle bottom into sectors extending in the direction of the shaft, the air flow of which sectors can be kept even irrespective of the tilting of the reactor. The practicability of the invention in ship use is emphasized in said patent application.

British Patent Specification 2,082,469 discloses an invention in which the flow of the combustion air through the grate is adjusted separately in each sector in an attempt to control the mixing and the transversal circulation flow of the particles to be fluidized. Various control means are provided for the particles and the gas flows for separating a feed, ash separation, and combustion zone in the fluidized bed.

Furthermore, British Patent Application 1,604,312 discloses an invention in which the grate of a rotation-symmetrical fluidized bed is formed by annular sectors forming a downwardly opening cone. The gas flow of each sector can be adjusted separately. The object is said to be to provide a circulating movement promoting the mixing of the fluidizing material. The invention is not suitable and does even intend to control the mixing of the gas flows, because a throttle point at which the gases are intermixed is provided in level with the upper surface of the fluidized bed.

Commercial heating boilers and steam boilers are known in which the nozzle bottom is divided by means of air cabinets into parts to be fluidized separately. This is done in order to widen the usable range of power mentioned above. However, practice has shown that a drastic stepping of the fluidizing of the different sectors causes, e.g., the solid fuel to be enriched to the sectors having the lower fluidizing rate. This, in turn, results in different kind of serious operational disturbances. Even though the different patent applications disclose a great number of solutions based on separate fluidizing of each sector, their application has lead to overwhelming difficulties.

The object of the present invention is thus to provide a method and a nozzle bottom by means of which the controllability of the combustion process can be improved considerably. By means of a method according to the invention this is achieved by passing the remaining part of the combustion air through essentially vertically directed jet nozzles positioned in the nozzle bottom and by maintaining the vertical penetration of the air jets introduced through the jet nozzles at an essentially higher value than that of the air jets introduced through the fluidizing nozzles. The nozzle bottom according to the invention, in turn, is characterized in that it further comprises essentially vertically directed jet nozzles the diameter of which is larger, preferably 5 to 20 times larger than the diameter of the fluidizing nozzles and the number of which is essentially smaller than the number of the fluidizing nozzles.

The basic idea of the invention is thus to introduce the combustion air wholly through the nozzle bottom even though the combustion process is carried out in a drastically staged manner in order to reduce the $NO_x$ discharges. By means of the method, a major part of the transversal surface above the level of the nozzle bottom up to a desired height can be kept understoichiometric.

The solution according to the invention also provides other advantages in addition to the improvement in the controllability of the combustion process mentioned above. One structural advantage is that no secondary air channels have to be provided. Further, the discharge of nitric oxide can be minimized as well as the energy losses of incombustible gases and coke due to an incomplete mixing, because the jet nozzles can be positioned in an appropriate way in view of the entire reactor.

In the following the invention will be described in more detail with reference to the example shown in the attached drawing, wherein FIG. 1 is a cross-sectional view of a circulating fluidized bed reactor in which the method and the nozzle bottom according to the invention are used, FIG. 2 is a top view of the reactor nozzle bottom according to the invention, and FIG. 3 is a cross-sectional view of the nozzle bottom of FIG. 2 as seen along the line A—A shown in FIG. 2.

FIG. 1 shows a symmetrical vertical section of a circulating fluidized bed reactor 1 which is wholly of a chilled structure. The reference numeral 2 indicates an air cabinet formed by panel walls 3, the ceiling of which cabinet is formed by a nozzle bottom 4. A reactor chamber 5 is provided above the nozzle bottom, and particle separators 6 are positioned at the top of the reactor chamber, partly within it. A circulating fluidized bed reactor of this type is described in more detail in Finnish Patent Application 861224, and its structure, being irrelevant to the basic idea of the invention, will not be discussed more closely in this connection.

Combustion air is wholly introduced into a reactor chamber via the air cabinet 2 through the nozzle bottom 4. The nozzle bottom is illustrated in more detail in FIG. 2, which is a top view from the direction of the reactor chamber 5. In practice, typical dimensions of the nozzle bottom are e.g. 2 m × 4 m, the area thereof being 8 m². The reference numeral 11 indicates fluidizing nozzles through which primary or fluidizing air is introduced into the reactor chamber 5. In order to obtain an even fluidizing, the fluidizing nozzles are positioned at regular intervals in the nozzle bottom 4. With the above-mentioned dimensions of the nozzle bottom, the interval between two adjacent fluidizing nozzles 11 is typically 100 mm. In addition to the fluidizing nozzles 11, there are jet nozzles 12 provided in the nozzle bottom 4; in this specific example, one jet nozzle per square meter, i.e. eight altogether. Accordingly, there are 100 nozzles per square meter in the nozzle bottom, of which 99 are fluidizing nozzles 11. The penetration as well as the bubble size of the jet of the fluidizing nozzles is low (the speed is levelled with the surroundings over a distance of about 0.5 m). The bubble size of the jet nozzles 12, in turn, is large; the jets penetrate the fluidized bed; and their speed difference with respect to the surroundings is typically levelled over a distance of 1.0 to 3.0 meters.

In this specific example, the diameter of the fluidizing nozzles 11 is 13 mm, and the plug velocity of the nozzle bottom 4 with the nominal effect is given the value 3 m/s, which corresponds to the numerical value 0.93 kg/(m²s) of the average density of the mass flow of the gas over the entire transversal surface. The reactor is dimensioned so that a plug velocity corresponding to the total gas flow is 6 m/s. Since the temperature with the nominal effect is nearly the same throughout the reactor in CFB reactors, the mass flow density corresponding to the total gas flow will be 1.86 kg/(m²s) and the proportional amount of the primary air from the total air flow 0.5 in this specific example. Correspondingly, the proportional amount of the air introduced through the jet nozzles 12 will be one half of the total air flow, i.e. 7.44 kg/s. In order that a major part of the transversal surface of the lower portion of the reactor would stay understoichiometric, the secondary air is introduced through the jet nozzles 12 having a much larger diameter than the fluidizing nozzles. The velocity of the air flow in the jet nozzle 12 is given a design value of 70 m/s. Assuming that the combustion air has been preheated to the temperature of 420° K., the diameter of the jet nozzles will be 130 mm in this specific example. In a typical application according to the invention, the ratio of the diameter of the fluidizing nozzles and that of the jet nozzles would be in the order of ten. Generally speaking, it is to be noted that the ratio of the diameters of the fluidizing and jet nozzles in the nozzle bottom according to the invention preferably varies from 5 to 20, the ratio of their numbers varying from 0.01 to 0.05. Neither the number nor the positioning of the jet nozzles in the nozzle bottom is dependent on the number and positioning of the fluidizing nozzles; instead, they are determined solely by the need of stepping the combustion process.

FIG. 3 shows a section of the nozzle bottom 4 of FIG. 2 along the line A—A. Both the fluidizing and the jet nozzles are provided with sand locks 13, 14 positioned below the nozzles. The fluidizing nozzles 11 have a constant transverse surface as well as the jet nozzles 12. The jet nozzles 12 can be provided with a grid the function of which is, on one hand, to guide the gas flow and, on the other hand, to prevent large bodies from entering the nozzle. The fluidizing nozzles and the jet nozzles can utilize one and the same air cabinet 2, because the mixing process is controlled primarily by the choise of the number of the jet nozzles. The smaller the number of the jet nozzles, the more drastic the stepping of the mixing. In FIG. 3, the nozzle bottom 4 is formed by a gas-tight cooling pipe system the adjacent pipes 15 of which are connected with fins 16. In order to protect the nozzle bottom from erosion, a ceramic protective layer 17 is cast on the upper surface thereof, the thickness of the layer being typically about 50 mm. Upper cones 18 of the fluidizing nozzles are formed in this protective layer, the opening angle $\alpha$ of the upper cones being approx. 10°.

Even though the invention has been described above with reference to the example of the figures, it is obvious that the invention is not restricted thereto, but can be modified within the inventive idea disclosed above in various ways. Even though the invention has thus been described with reference to its most important application, i.e. a combustion process, it is self-evident that the same method can be applied for controlling some other chemical process in which the desired end result can be obtained by delaying the mixing of gases. One of the jet nozzles may also be formed of a plurality of adjacent fluidizing nozzles.

I claim:

1. A method for controlling the staging of the combustion process in fluidized bed reactors and circulating fluidized bed reactors, in which method combustion air is introduced through a nozzle bottom in such a way that part of the combustion air is introduced into a reactor chamber through a plurality of vertically directed fluidizing nozzles positioned in said nozzle bottom and the remaining part of the combustion air is introduced through a plurality of essentially vertically directed jet nozzles positioned in said nozzle bottom, the ratio of the diameter of the fluidizing and jet nozzles being approximately 5 to 20, said fluidizing and jet nozzles being in communication with a common air cabinet, wherein the vertical air penetration of said jet nozzles is maintained at a value essentially higher than that of said fluidized nozzles, and the vertical air penetration of said jet nozzles is adequate to penetrate the fluidized bed.

2. A nozzle bottom for controlling the staging of the combustion process in fluidized bed reactors and circulating fluidized bed reactors, the nozzle bottom comprising a plurality of fluidizing nozzles for introducing part of the vertically directed fluidizing air into a reactor chamber and a plurality of essentially vertically directed jet nozzles for introducing the remaining part of the combustion air into said reactor chamber, said fluidized and jet nozzles being in communication with a common air cabinet, wherein the vertical air penetration of said jet nozzles is maintained at a value essentially higher than that of said fluidizing nozzles, the diameter of said jet nozzles is approximately 5 to 20 times larger than the diameter of said fluidizing nozzles, and the number of said jet nozzles is smaller than the number of said fluidizing nozzles.

3. A nozzle bottom according to claim 2, wherein the number of said jet nozzles is 0.01 to 0.05 times the number of said fluidizing nozzles.

* * * * *